US012250363B2

(12) United States Patent
Lee et al.

(10) Patent No.: US 12,250,363 B2
(45) Date of Patent: Mar. 11, 2025

(54) VIRTUAL 3D DISPLAY APPARATUS

(71) Applicant: Carson Wai Keung Lee, Kowloon (HK)

(72) Inventors: Carson Wai Keung Lee, Kowloon (HK); Wai Yeung Cheung, Kowloon (HK)

(73) Assignee: Carson Wai Keung Lee, Kowloon (HK)

( * ) Notice: Subject to any disclaimer, the term of this patent is extended or adjusted under 35 U.S.C. 154(b) by 272 days.

(21) Appl. No.: 17/607,373

(22) PCT Filed: Mar. 2, 2021

(86) PCT No.: PCT/CN2021/078653
§ 371 (c)(1),
(2) Date: Oct. 28, 2021

(87) PCT Pub. No.: WO2021/185073
PCT Pub. Date: Sep. 23, 2021

(65) Prior Publication Data
US 2022/0224878 A1 Jul. 14, 2022

(30) Foreign Application Priority Data
Mar. 18, 2020 (HK) .......................... 32020004488.3

(51) Int. Cl.
*H04N 13/393* (2018.01)
*G02B 26/10* (2006.01)
*G02B 30/54* (2020.01)

(52) U.S. Cl.
CPC ......... *H04N 13/393* (2018.05); *G02B 26/103* (2013.01); *G02B 30/54* (2020.01)

(58) Field of Classification Search
CPC .... H04N 13/393; H04N 13/388; G09G 3/003; G02B 30/54; G02B 26/103; G02B 30/50; G02B 6/08
(Continued)

(56) References Cited

U.S. PATENT DOCUMENTS 4,525,711 A   6/1985   Gery
6,195,016 B1 * 2/2001   Shankle .................. G09F 9/305
                                              385/115
(Continued)

FOREIGN PATENT DOCUMENTS

CN   201511742 U   6/2010
CN   202648632 U   1/2013
(Continued)

OTHER PUBLICATIONS

Chinese First Office Action Search Result for Application 202180002586.3 dated May 23, 2023.
(Continued)

*Primary Examiner* — Thai Q Tran
*Assistant Examiner* — Nienru Yang
(74) *Attorney, Agent, or Firm* — Renner, Kenner, Greive, Bobak, Taylor & Weber

(57) ABSTRACT

Virtual 3D display apparatus has a display zone, an optical fiber assembly and a motor. The optical fiber assembly includes optical fibers each having an input end for entrance of light and an output end. There are light sources each at the input end of a respective optical fiber for generating a light signal that enters and travels along the optical fiber and is then emitted at the output end thereof. The emitted light signals together form a virtual 3D image in the display zone upon rotation of the optical fiber assembly by the motor. There are also control elements at the input ends of respective optical fibers, each for operation to make adjustment of
(Continued)

the virtual 3D image based on a control signal that travels along the respective optical fiber, with the adjustment to be made to a part of the virtual 3D image associated with the same optical fiber.

23 Claims, 10 Drawing Sheets

(58) Field of Classification Search
    USPC .......................................................... 348/51
    See application file for complete search history.

(56)         References Cited

U.S. PATENT DOCUMENTS

| | | | |
|---|---|---|---|
| 2004/0146256 | A1 | 7/2004 | Solntsev |
| 2007/0247519 | A1* | 10/2007 | Riaziat ................. H04N 13/305 348/51 |
| 2008/0136981 | A1 | 6/2008 | Kawakami et al. |
| 2019/0353975 | A1* | 11/2019 | Didomenico ............ G02B 3/14 |

FOREIGN PATENT DOCUMENTS

| | | | |
|---|---|---|---|
| CN | 103513328 | A | 1/2014 |
| CN | 108139587 | A | 6/2018 |
| CN | 109493774 | A | 3/2019 |
| CN | 110364096 | A | 10/2019 |
| FR | 2912244 | A1 | 8/2008 |
| JP | 2008292577 | A * | 12/2008 |
| WO | 2001016908 | A1 | 3/2001 |

OTHER PUBLICATIONS

International Search Report and Written Opinion issued in International Application No. PCT/CN2021/078653 mailed May 26, 2021.
European Search Report for application No. 21772413.7-1020 / 4004899 PCT/CN2021078653 dated Jul. 8, 2023.
CN Office Action Report for application No. 202180002586.3 dated Sep. 7, 2023.

* cited by examiner

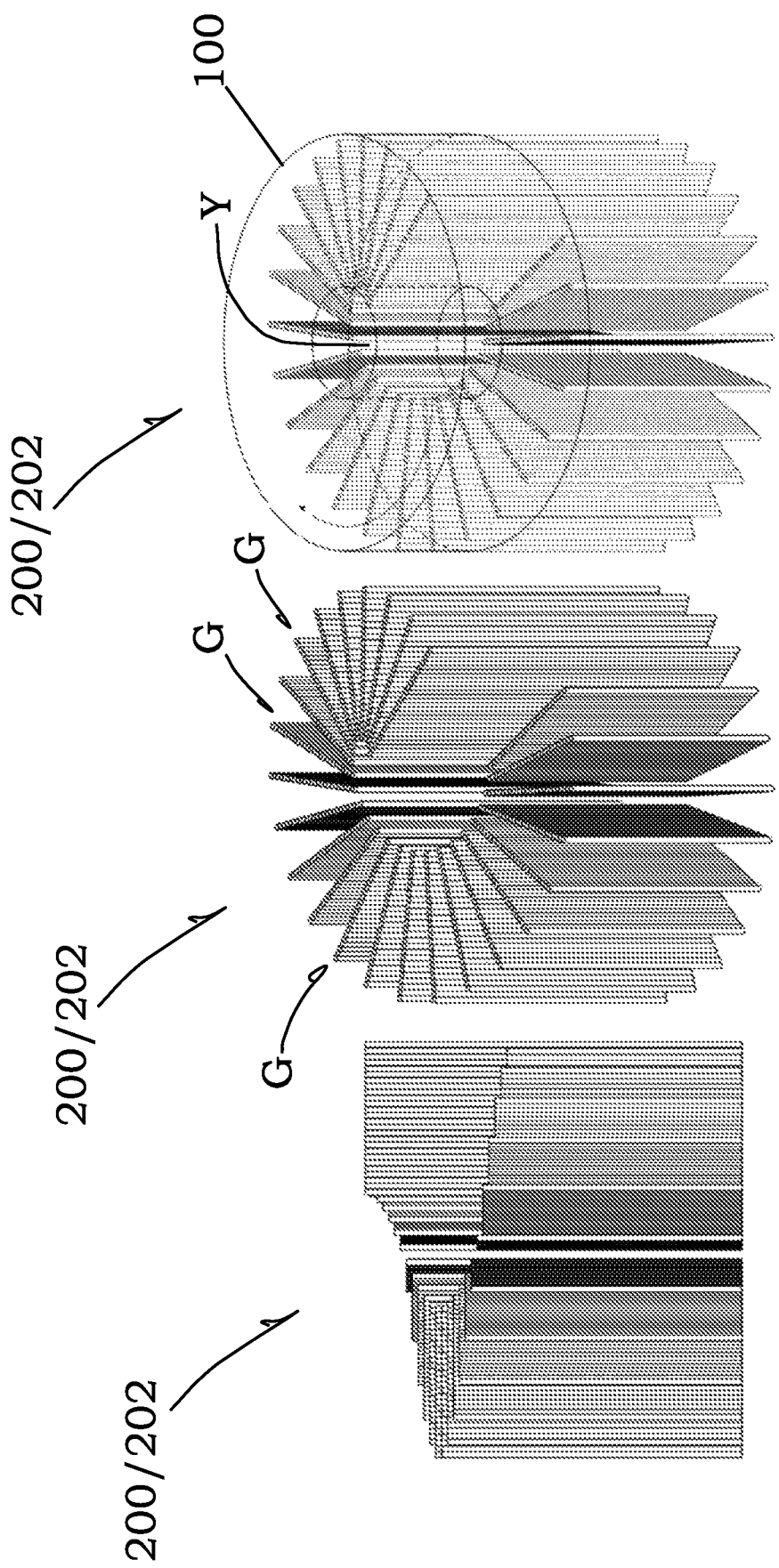

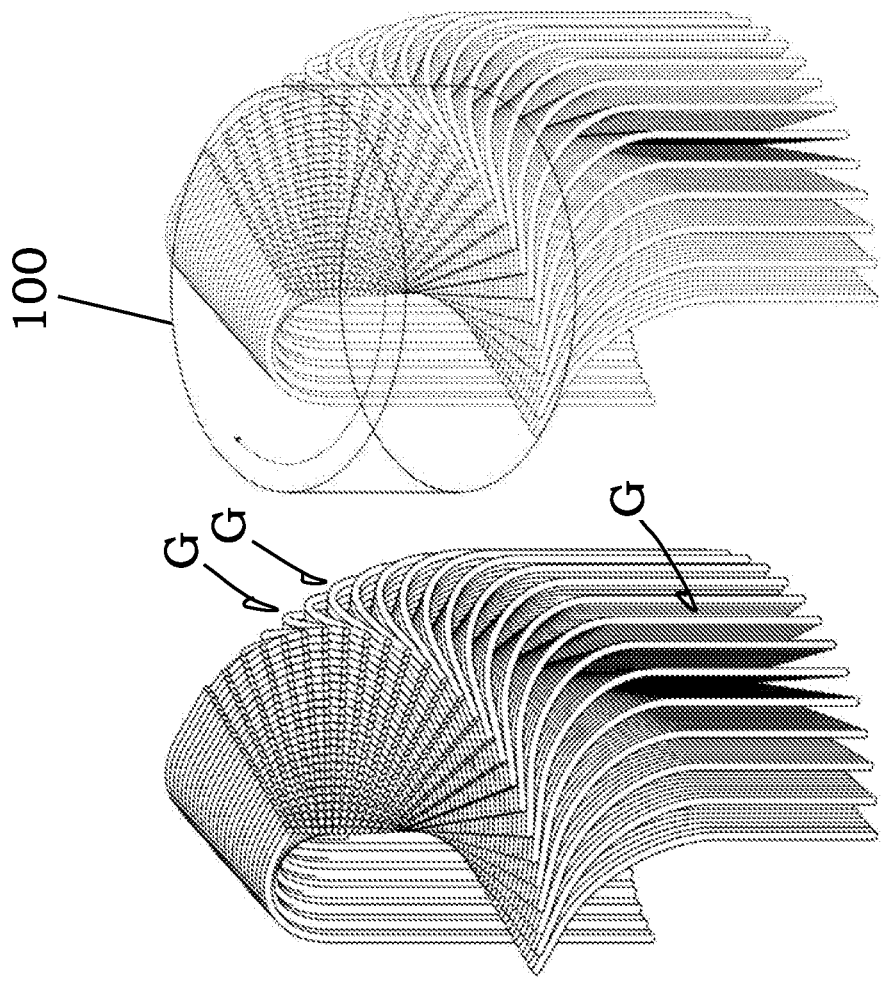
FIG. 8C
FIG. 8A
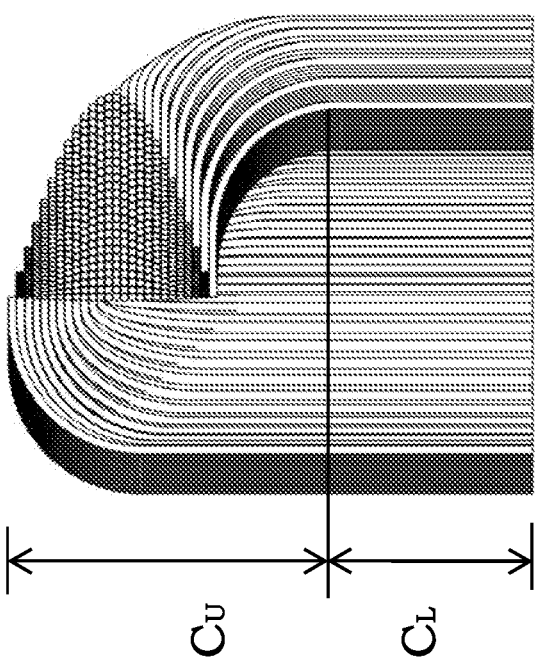
FIG. 8B

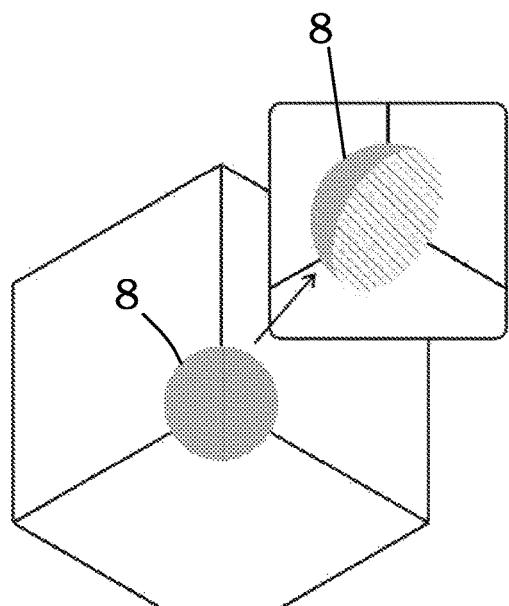
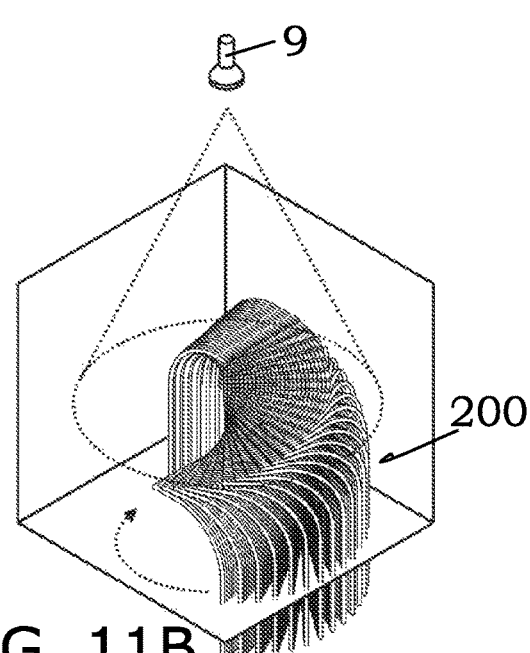
FIG. 11A  FIG. 11B
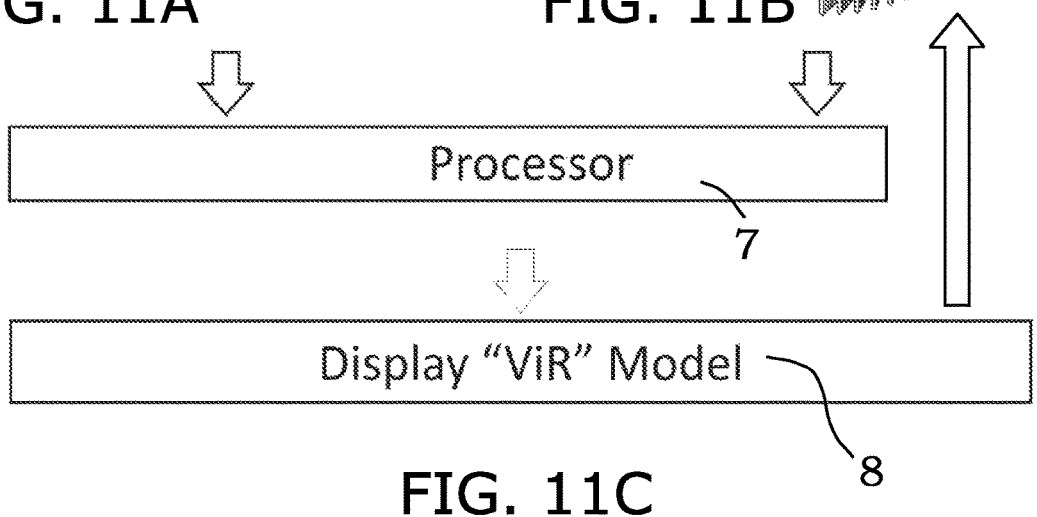
FIG. 11C

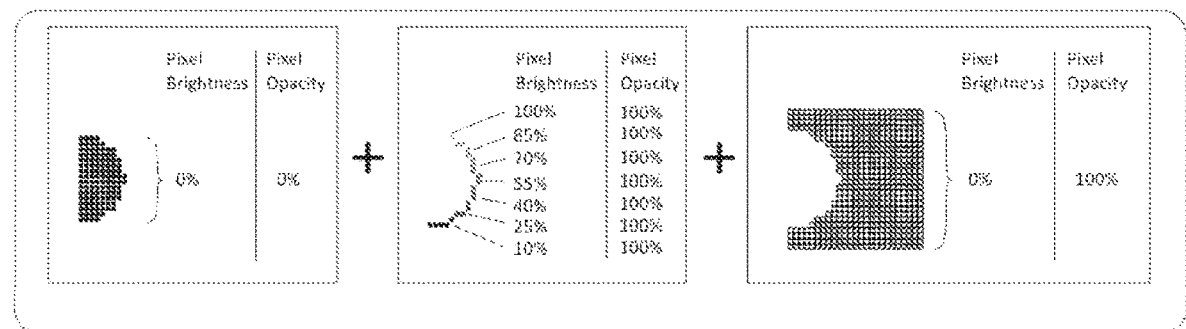
FIG. 12A
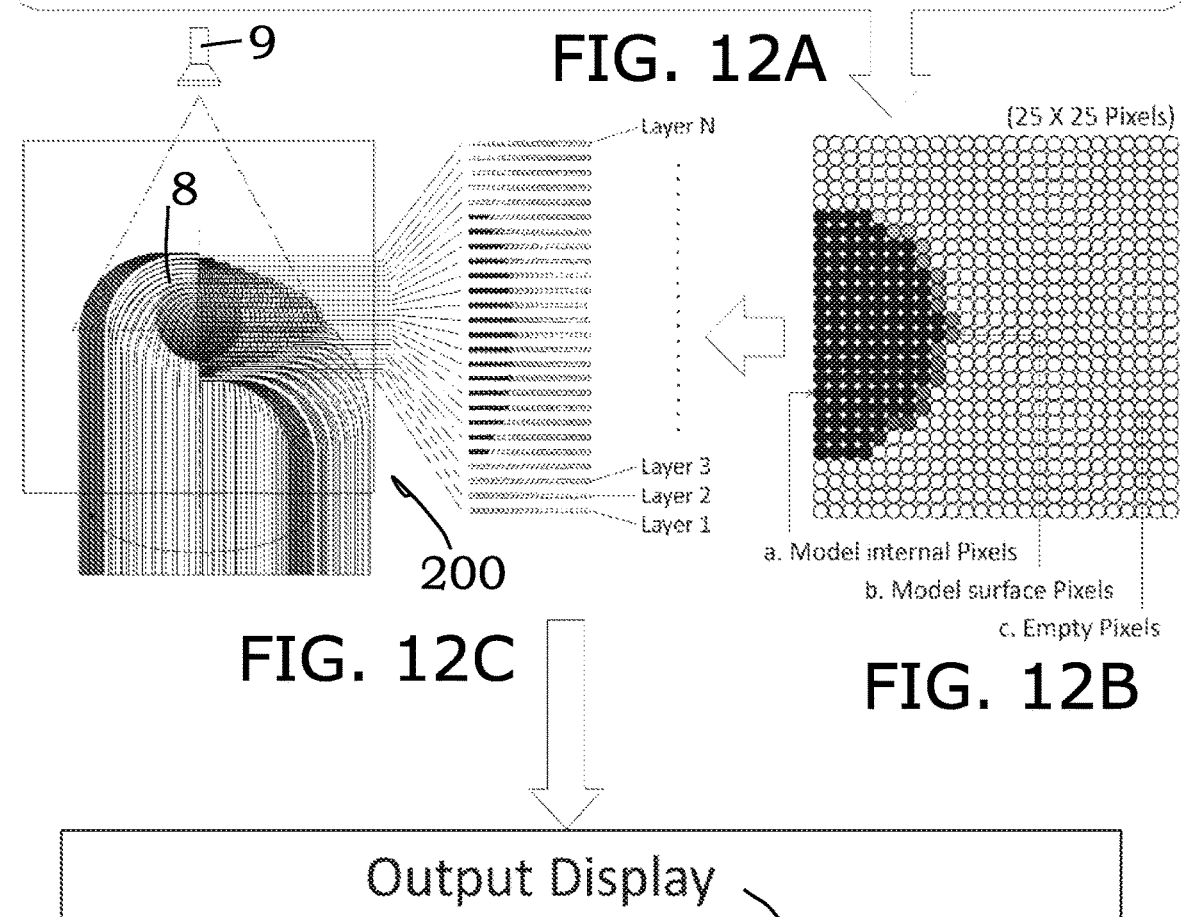
FIG. 12C
FIG. 12B
FIG. 12D

VIRTUAL 3D DISPLAY APPARATUS

CROSS-REFERENCE TO RELATED APPLICATIONS

The subject application is a U.S. National Stage application of International Application No. PCT/CN2021/078653, filed on 2 Mar. 2021, which claims the benefit of Hong Kong Patent Application No. 32020004488.3, filed on 18 Mar. 2020. The contents of which are herein incorporated by reference in their entirety.

TECHNICAL FIELD

The present invention relates to a virtual 3D display apparatus.

BACKGROUND OF THE INVENTION

Virtual 3D display apparatuses are generally known. Some of these display apparatuses display multi-dimension virtual images or models in the physical world for viewing by multiple audiences with naked eyes. In operation, the display apparatus is linked to an online or offline source of virtual models created by pertaining spatial modeling and graphical authoring software and/or deliverables from multimedia technologies, e.g. videos, games, animations etc., procurable or producible in the market.

In the vast majority of cases, experiences indicate that virtual 3D images generated by known virtual 3D display apparatuses are far from satisfactory in terms of quality and in particular lifelikeness when compared to what would normally be expected from a model in the physical world that mimics a real object.

The invention seeks to eliminate or at least to mitigate such a shortcoming by providing a new or otherwise improved virtual 3D display apparatus.

SUMMARY OF THE INVENTION

According to the invention, there is provided a virtual 3D display apparatus comprising a display zone, in which a virtual 3D image is to be displayed, an optical fiber assembly, and a prime mover for driving the optical fiber assembly in motion. The optical fiber assembly includes an input, an output positioned in the display zone, and a plurality of optical fibers each having an input end arranged at the input of the optical fiber assembly for entrance of light and an output end arranged at the output of the optical fiber assembly. Included is a plurality of light sources provided at the input of the optical fiber assembly, with each light source at the input end of a respective optical fiber for generating a respective light signal that enters and travels along the optical fiber and is then emitted at the output end thereof. The emitted light signals together form a virtual 3D image in the display zone upon motion of the optical fiber assembly by the prime mover. There is also a plurality of control elements provided at the input of the optical fiber assembly and in particular the input ends of respective optical fibers, each for operation to make adjustment of a said virtual 3D image based on a control signal that travels along the respective optical fiber, with the adjustment to be made to a part of a said virtual 3D image associated with the same optical fiber.

Preferably, at least one of the optical fibers has at least two, first and second input ends, with a respective light source provided at the first input end and a respective control element provided at the second input end.

More preferably, said at least one optical fiber incorporates a multimode combiner connecting said at least two input ends.

In one preferred embodiment, at least one of the control elements comprises a light sensor for sensing ambient light at the output end of the respective optical fiber, which acts as a said control signal and travels from the output end along the optical fiber to the light sensor.

More preferably, the adjustment comprises adjusting brightness of the light source associated with the optical fiber based on said ambient light sensed by the light sensor.

In another preferred embodiment, at least one of the optical fibers incorporates control means at the output end for controlling an optical effect at the output end of the optical fiber, and the associated control element comprises a signal generator for generating a control signal that travels from the input end along the optical fiber to the control means for controlling the control means to adjust the optical effect at the output end of the optical fiber.

More preferably, the control means comprises a lens whose optical effect is adjustable in response to a control signal generated by the signal generator.

Further more preferably, the optical effect of the lens that is adjustable comprises opacity.

Yet further more preferably, the signal generator is adapted to generate a control signal that is an electromagnetic radiation of wavelengths or frequencies outside the visible electromagnetic spectrum, and preferably a UV control signal.

In a preferred construction, the optical fibers are divided into a plurality of groups, with the output ends of the optical fibers of each group being arranged in a sequence for lateral movement across a portion of the display zone to form a respective part of a virtual 3D image.

More preferably, the output ends of the optical fibers of each group are arranged in a linear sequence.

More preferably, the optical fibers of each group are arranged in at least one of a flat and curved plane configuration.

Further more preferably, the optical fibers of each group are arranged in a flat plane configuration, and the groups of optical fibers are arranged in an equiangular arrangement about an axis of the optical fiber assembly extending across the input and output thereof.

Yet further more preferably, the equiangular arrangement is also a radial symmetrical arrangement.

Yet further more preferably, the groups of optical fibers are arranged in a radial symmetrical arrangement over an angle in the range of substantially 180° to 360° about the axis.

It is preferred that the optical fibers of each group are arranged with their output ends in a curved plane configuration and at least a part of the rest in a flat plane configuration adjoining the curved plane configuration.

It is further preferred that the curved plane configuration of each group of optical fibers turns from the flat plane configuration through an angle in the range of substantially 0° to 90°.

In a preferred embodiment, the groups of optical fibers are arranged in a radial symmetrical arrangement about an axis of the optical fiber assembly extending across the input and output thereof.

More preferably, the groups of optical fibers are arranged in a radial symmetrical arrangement over an angle of substantially 180° about the axis.

It is preferred that the output ends of the optical fibers are arranged, as between adjacent groups, at different levels to progressively occupy the display zone.

It is preferred that the output ends of the optical fibers of each group are arranged at a different level relative to those of an adjacent group, thereby together progressively occupying the display zone.

In a preferred embodiment, the optical fiber assembly is arranged to be driven by the prime mover to rotate about the axis.

Preferably, the display zone has a substantially cylindrical shape.

BRIEF DESCRIPTION OF DRAWINGS

The invention will now be more particularly described, by way of example only, with reference to the accompanying drawings, in which:

FIG. 7A is a perspective view of a first embodiment of the optical fiber assembly of FIG. 1;

FIG. 7B is a side view of the optical fiber assembly of FIG. 7A;

FIG. 7C is a perspective view similar to FIG. 7A, outlining a display zone of the optical fiber assembly;

FIG. 8A is a perspective view of a second embodiment of the optical fiber assembly of FIG. 1;

FIG. 8B is a side perspective view of the optical fiber assembly of FIG. 8A;

FIG. 8C is a perspective view similar to FIG. 8A, outlining a display zone of the optical fiber assembly;

FIGS. 11A to 11C are sequential diagrams illustrating the operation of the virtual 3D display apparatus of FIG. 1 in generating a virtual 3D image of a sphere; and FIGS. 12A to 12D are sequential diagrams illustrating the same operation, but on a pixel level, of the virtual 3D display apparatus of FIG. 1 in generating the virtual 3D image of a sphere.

DETAILED DESCRIPTION OF PREFERRED EMBODIMENTS

Figure 1:
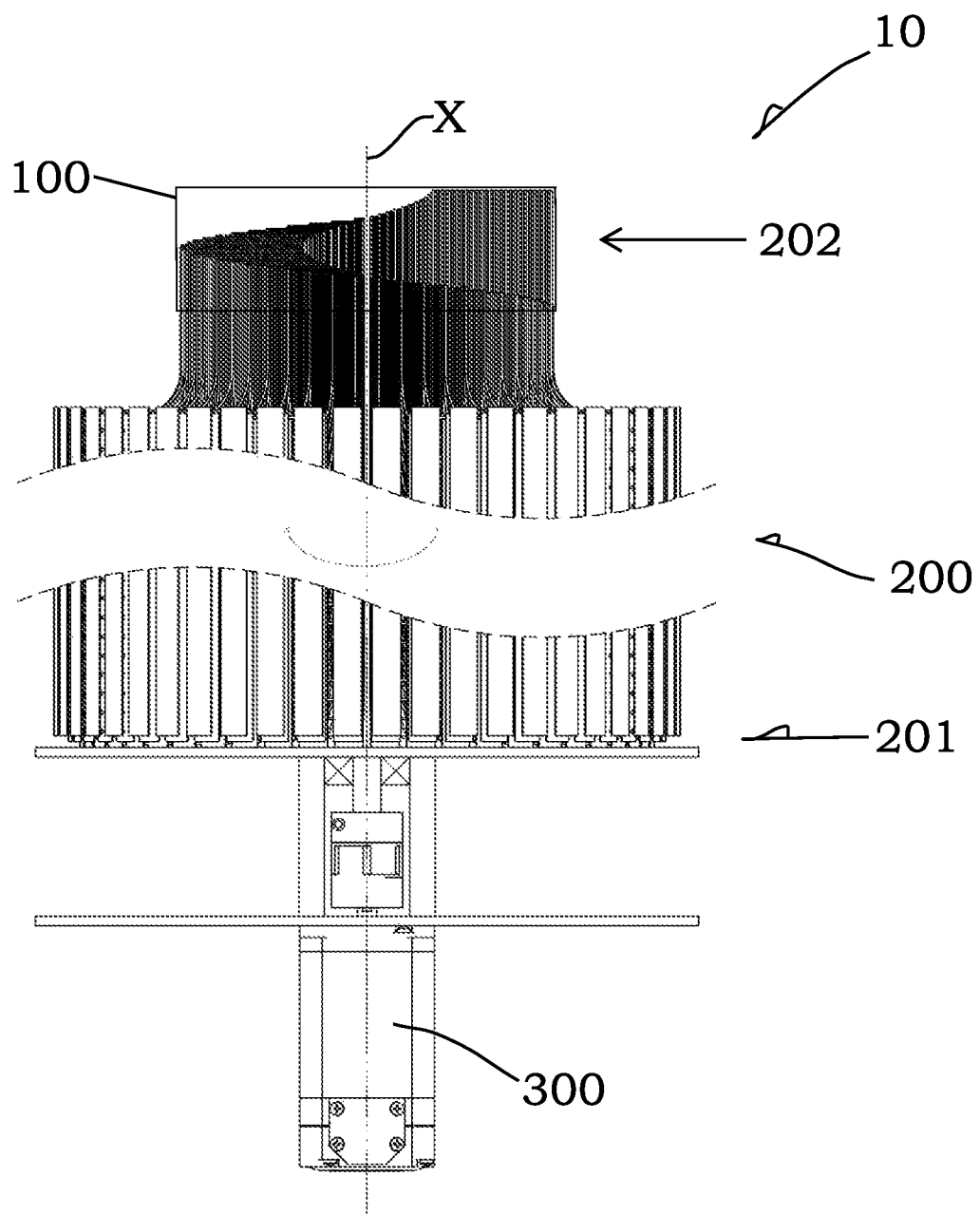
FIG. 1 is a side view of an embodiment of a virtual 3D display apparatus in accordance with the invention, which includes an optical fiber assembly.
Figure 2:
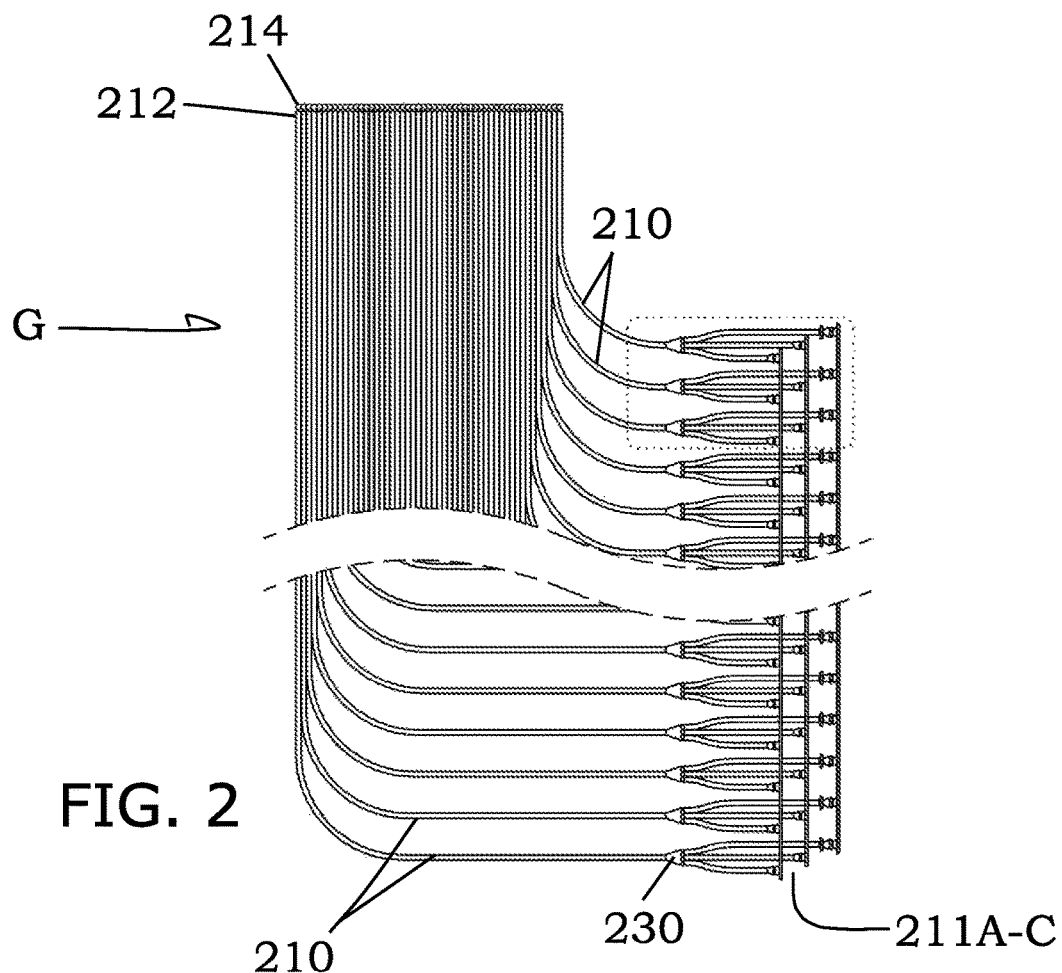
FIG. 2 is a side view of one of a plurality of groups of optical fibers of the optical fiber assembly of FIG. 1.
Figure 3:
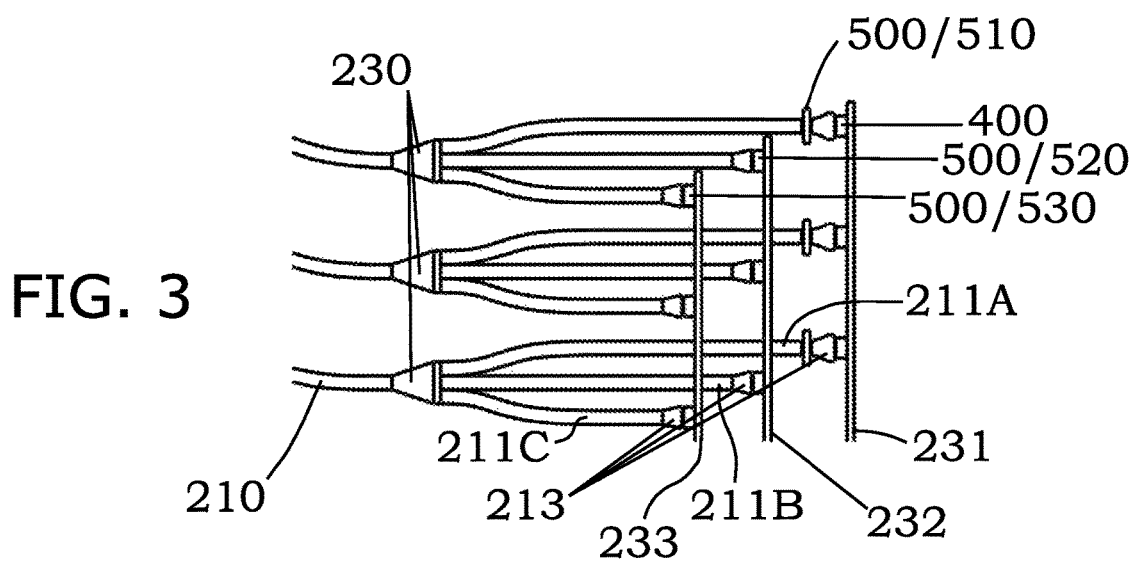
FIG. 3 is an enlarged side view of input ends of three of the optical fibers of FIG. 2.

Referring initially to FIGS. 1 to 9C of the drawings, there is shown a virtual 3D display apparatus 10 embodying the invention, which comprises a display zone 100, in which a virtual 3D image is to be displayed, an optical fiber assembly 200 including an input 201 and an output 202, with the output 202 positioned in the display zone 100, and a prime mover 300 for driving the optical fiber assembly 200 in motion. The optical fiber assembly 200 has an axis and, in particular, a vertical central axis X that extends across or through the input 201 and output 202 thereof. The optical fiber assembly 200 is arranged to be driven by the prime mover 300 to rotate about the axis X, with the display zone 100 being of a substantially cylindrical shape. The prime mover 300 is preferably provided by an electric motor 300.

The optical fiber assembly 200 includes a plurality of optical fibers 210, each having an input end 211 arranged at the input 201 of the optical fiber assembly 200 for entrance of light and an output end 212 arranged at the output 202 of the optical fiber assembly 200. Included is a plurality of light sources 400 provided at the input 201 of the optical fiber assembly 200. Each light source 400 is positioned at the input end 211 of a respective optical fiber 210 for generating a respective light signal that enters and travels along the optical fiber 210 and is then emitted at the output end 212 thereof to generate an (RGB) illuminating spot, i.e. pixel, at the other end 212. Such illuminating spots on the optical fibers 210 together form a virtual 3D image in the display zone 100 upon rotation of the optical fiber assembly 200 by the motor 300 reaching a threshold speed, whereupon optical illusion will be perceived by audiences due to persistent of vision (POV).

There is a plurality of control elements 500 provided at the input 201 of the optical fiber assembly 200 and in particular the input ends 211 of respective optical fibers 210. Each control element 500 is for operation to make adjustment of a said virtual 3D image based on a control signal that travels along the respective optical fiber 210 in one of two opposite directions. The adjustment is to be made to a part of the virtual 3D image that is associated with the same optical fiber 210.

In general, at least one of the optical fibers 210 has at least two input ends that are provided with respective control elements 500 and one light source 400. In the described embodiment, for the vast majority if not all of the cases, each optical fiber 210 has three input ends 211A, 211B and 211C, to which there are provided respective first, second and third control elements 510, 520 and 530 and the one light source 400.

The multiple ends 211A-211C are jointed to the optical fiber's main body by means of a multimode combiner 230. The multimode combiner 230 provides a low loss means of converging light or light signal from more than one source, i.e. the light source 400 and two control elements 500, into one optical fiber, i.e. the optical fiber 210. In the reverse direction, the multimode combiner 230 diverge light/light signal from the optical fiber 210 to the input ends 211A-211C.

The output end 212 of each optical fiber 210 is fitted with a micro lens 214 for emitting light in a desired manner in terms of direction and, in particular, angle of coverage i.e. diverging the illuminating spot to widen the angular line-of-sight for audiences.

The first input end 211A is terminated with the respective control element 510 and then a micro lens 213, to which the light source 400 is attached. The second and third input ends 211B and 211C are each terminated with a micro lens 213, to which there are attached the second and third control elements 500 respectively.

In general, the micro lenses 213 and/or 214 may be either made of or coupled/coated with a material with optical properties e.g. in particular colour and opacity (or in other words transparency) that can be changed reversibly by external energy such as electromagnetic radiation of a wavelength or frequency falling outside the visible electromagnetic spectrum, e.g. UV radiation, thermal energy, electrical energy and physical deformation, etc. Changing the optical properties of the micro lenses 213 and/or 214 will result in a change in the corresponding optical effect or characteristic of light transmission and hence the characteristic of the resulting illuminating hot spots.

In the case of the micro lens 214, it is made such that its opacity will change or is adjustable in response to UV radiation, which is outside the visible spectrum to avoid affecting the displayed image, and the degree of opacity is dependent upon the frequency of such UV radiation.

The three input ends 211A-211C and related control elements 510-530 are of different natures and provided to perform different functions for the operation of the subject virtual 3D display apparatus 10, which are "brightness control", "ambiance control" and "opacity control" respectively.

The first input ends 211A of all the optical fibers 210 together admit a complete image signal of each frame from a source of virtual images/models to enter the optical fiber assembly 200, via the input 201 thereof. Each first input end 211A admits a respective part, or pixel, of the overall image to be displayed in the display zone 100.

The image signal pertaining to that pixel is outputted by the associated light source 400 under the operation by an output device associated with the source of virtual images/ models.

Figure 4:
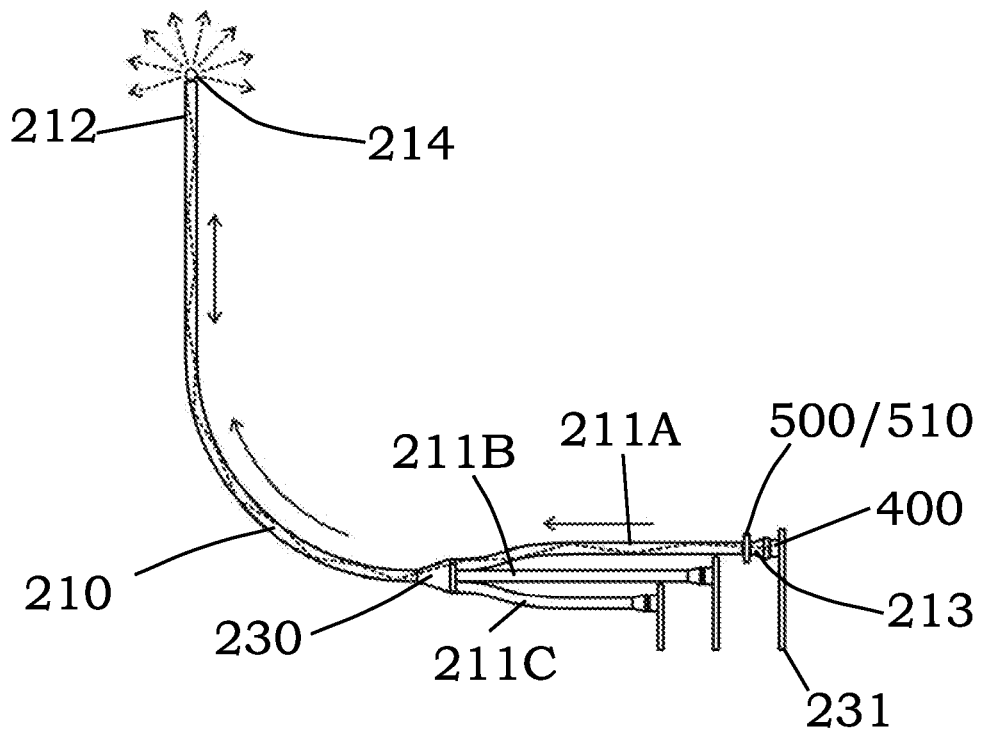
FIG. 4 is a side view of each optical fiber of FIG. 3, which has three input ends, showing the function of a first input end thereof.

The light source 400, which outputs electromagnetic radiation of frequencies (or wavelengths) in the visible spectrum of the electromagnetic spectrum (e.g. LED light or laser), is preferably provided by a colour RGB LED 400. As shown in FIG. 4, the pixel image signal generated by the colour RGB LED 400 is fed into the optical fiber 210 through the first control element 510, which is a brightness control element 510 that controls the brightness of the image signal to implement "brightness control" upon the resulting pixel of the displayed image. The brightness control element 510 may be provided by any suitable device generally known in the art, such as an electronic variable ND (neutral density) filter.

Figure 5:
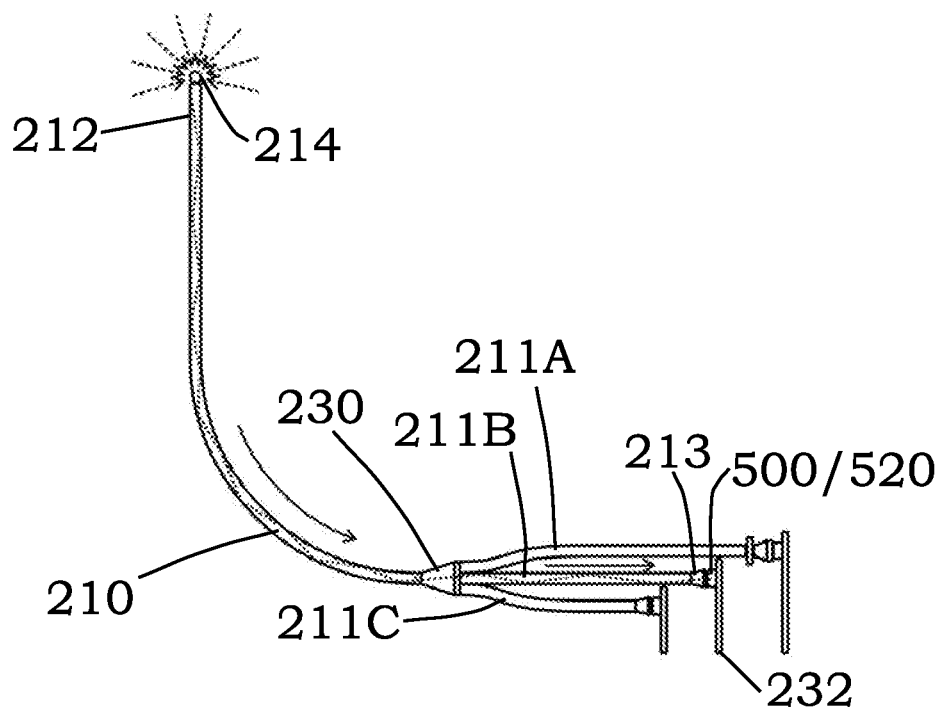
FIG. 5 is a side view similar to FIG. 4, showing the function of a second input end of the optical fiber.

As to the second input end 211B, the associated second control element 520 is provided by a light sensor 520 which serves to sense or measure ambient light picked up at the output end 212 of the respective optical fiber 210, which travels back along the optical fiber 210, as shown in FIG. 5. Such ambient light acts as a control signal that travels from the output end 212 along the optical fiber 210 to the input end 211B, reaching the light sensor 520.

The ambient light is light in the display zone 100, i.e. information about the lighting condition (e.g. direction of lighting and distribution of light) inside the display zone 100, in which the virtual 3D image is displayed. Collection of such information by the assembly of optical fibers 210 at every moment in time provides a real-time indication of the display's lighting condition precisely at where all pixels of the displayed image are, i.e. outputted at the optical fibers' output ends 212. On a pixel-by-pixel basis, the collected information is detected by the array of light sensors 520 and used as respective control signals based on which the virtual 3D image is adjusted to reflect how the displayed image, as a virtual 3D object, should appear under the said display lighting condition.

The adjustment involved is to adjust the brightness of the light sources i.e. colour RGB LED 400, each through the use of the brightness control element 510 associated with the same optical fiber 210, based on the said ambient light sensed by the light sensors 520. This is to implement "ambiance control" upon the resulting pixels of the displayed image.

Figure 10:
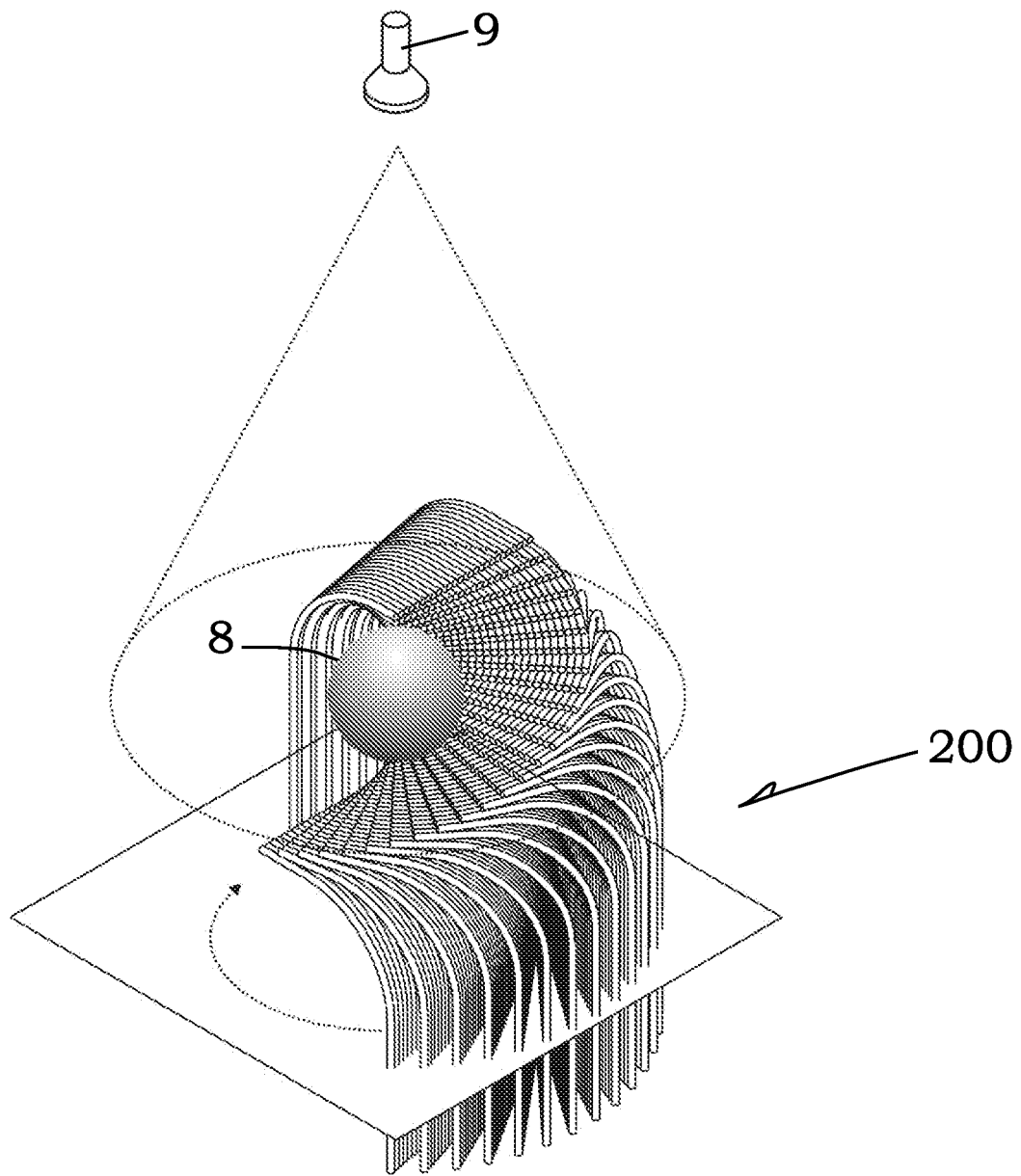
FIG. 10 is a perspective view of the optical fiber assembly of FIG. 1 generating a virtual 3D image of a sphere, illustrating ambiance control.

An example of "ambiance control" is shown in FIG. 10, in which the ambient light upon the display zone 100 is mainly provided by a lamp 9 that shines from directly above the display zone 100. The virtual 3D display apparatus 10 is in operation displaying, in its display zone 100, a virtual 3D image in the form of a sphere 8. The colour RGB LEDs 400 that display the upper surface of the sphere 8 are adjusted brighter to brighten the upper surface, thereby making the upper surface look as if it were a genuine surface facing a light source. Those colour RGB LEDs 400 that display the sphere's lower surface are dimmed to make the lower surface appear cast in a shadow. With such ambiance control, the lifelikeness of the virtual 3D image of a sphere as a real object is much enhanced.

Figure 6:
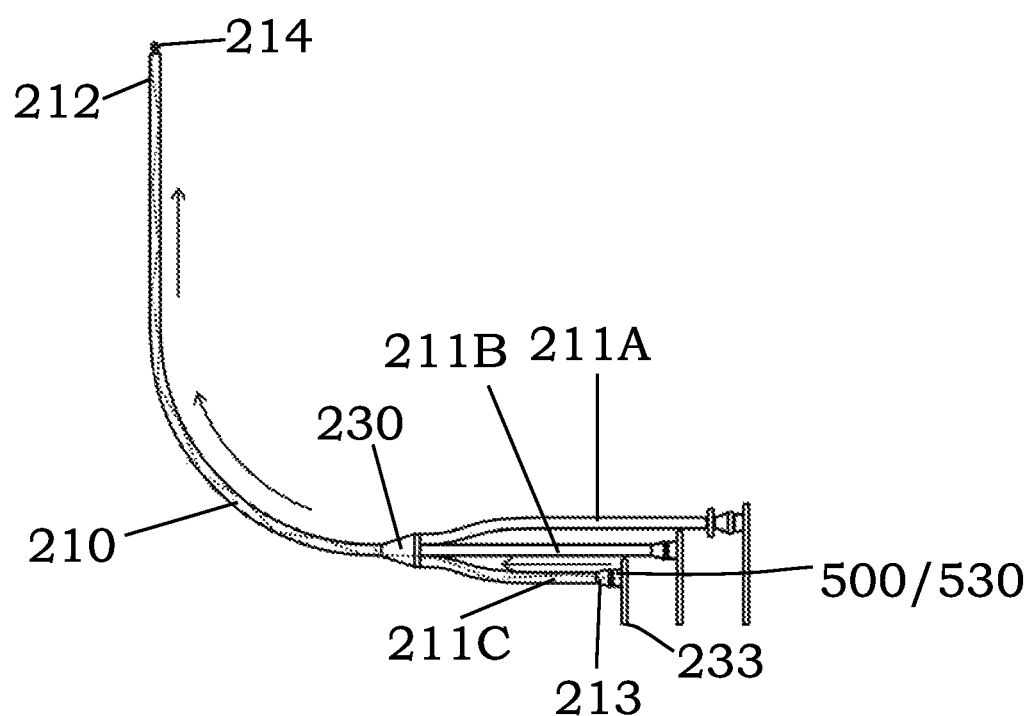
FIG. 6 is a side view similar to FIG. 5, showing the function of a third input end of the optical fiber.
Figure 9C:
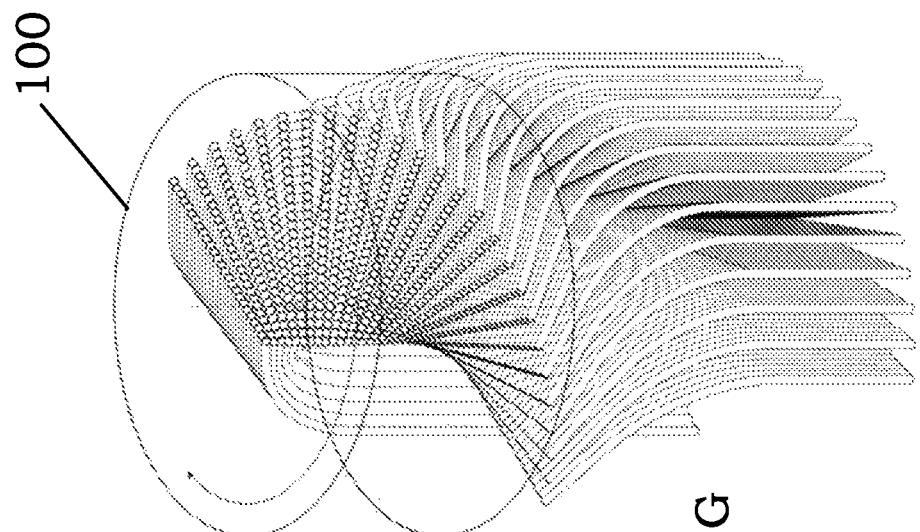
FIG. 9C is a perspective view similar to FIG. 9A, outlining a display zone of the optical fiber assembly.
Figure 9A:
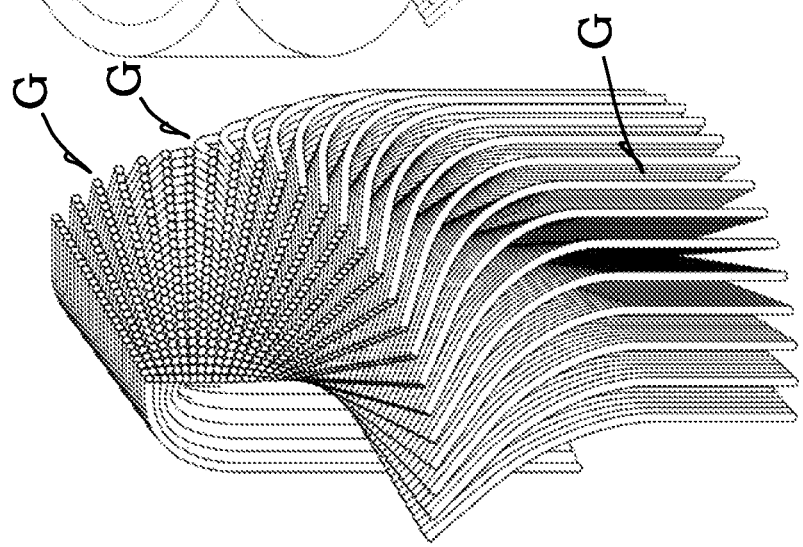
FIG. 9A is a perspective view of a third embodiment of the optical fiber assembly of FIG. 1.
Figure 9B:
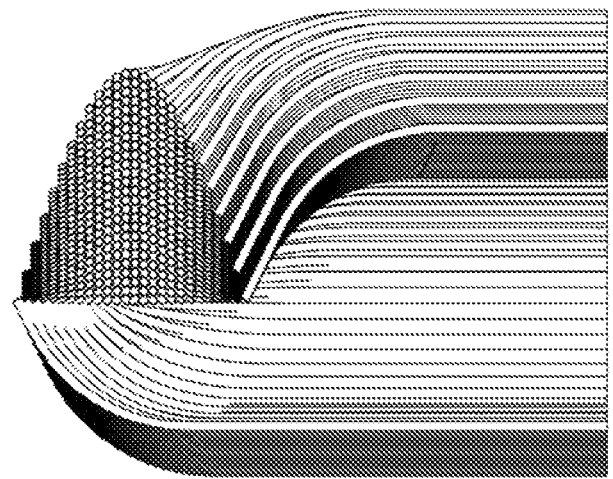
FIG. 9B is a side view of the optical fiber assembly of FIG. 9A.

Turning to the third input end 211C, the associated third control element 530 is provided by a signal generator and in particular a UV light generator in the form a UV LED 530. The UV LED 530 is designed to emit UV radiation, of a variable frequency, as a control signal that travels from the input end 211C along the optical fiber 210 to reach the micro lens 214 at the output end 212, as shown in FIG. 6. Through varying of the frequency of its output light, the UV LED 530 is useful in adjusting the opacity of the micro lens 214.

In general, each optical fiber 210 incorporates control means at its output end 212, that is the micro lens 214, for controlling or adjusting an optical effect at the output end 212 of the optical fiber 210 and in particular opacity at the output end 212 thereof. Such output end opacity is adjustable upon application of a UV control signal to the micro lens 214 from the UV light generator 530 at the input end 211C.

The optical fiber 210 will output light of a relatively more solid colour, or denser or richer colour, when its output end 212 turns partially translucent or opaque from transparent (i.e. less transparent). This is because the output light will be diffused at the partially-opaque output end 212, where the output light and in turn its colour will become relatively more concentrated and/or discernible. This effect is particularly effective for a dark colour, such as black that results in true black. "Opacity control" is thus implemented upon the resulting pixel of the displayed image.

Three embodiments of the optical fiber assembly 200 with different constructions are now described with reference to FIGS. 7A-7C, 8A-8C and 9A-9C.

In general, the optical fibers 210 are divided into a plurality of groups (or flat bundles) G, with the output ends 212 of the optical fibers 210 of each group G being arranged in a sequence for lateral movement across a portion of the display zone 100 to form a respective part of a virtual 3D image. Specifically, the output ends 212 of the optical fibers 210 of each group G are arranged in a linear sequence. More specifically, the optical fibers 210 of each group G are arranged in at least one of a flat plane configuration (FIGS. 7A-7C) and a curved plane configuration, or in a combined flat and curved plane configuration (FIGS. 8A-8C and 9A-9C). All such configurations are individually layers and collectively layered.

In each group G of the optical fibers 210, their first, second and third input ends 211A, 211B and 211C are mounted on respective control boards 231, 232 and 233 for "brightness control", "ambiance control" and "opacity control" respectively.

In a first embodiment of the optical fiber assembly 200 (FIGS. 7A-7C), the optical fibers 210 of each group G are arranged in a flat plane configuration and may be mounted on and over a thin flat plate former. The optical fibers 210 are arranged in a closely packed co-parallel manner on the flat plate former, extending straight across upper and lower ends thereof.

In this example, there are twenty five (25) such flat-plane groups G of optical fibers 210, and they are arranged in an equiangular arrangement about the central axis X of the optical fiber assembly 200 preferably over an angle in the range of substantially 180° to 360° about the axis X. The equiangular arrangement is also a radial (or angular) symmetrical arrangement, with the flat plane of each group G containing the central axis X or, when viewed in the direction of the central axis X, extending through the axial centre. As is shown, the groups G are arranged over an angle of 360° about, i.e. completely around, the axis X.

The groups G of optical fibers 210 have progressively changing lengths, or heights as oriented, from one group G to the next group G. They are arranged from the tallest to the shortest, or vice versa, on a horizontal surface, with their output ends 212 pointing vertically upwards and together forming a spiral staircase arrangement in the display zone 100. The spiral staircase arrangement occupies generally the entire width and height of the display zone 100. Each step of the spiral staircase arrangement is taken up by a linear row of the output ends 212 in the relevant group G at a respective different level of the display zone 100, for rotation to swipe across a horizontal cross-section of the display zone 100 at that level for displaying the same cross-section of the virtual 3D image in the display zone 100. In general, the output ends 212 are arranged, as between adjacent groups G, at different levels to progressively, and sequentially, occupy the display zone 100.

In a second embodiment of the optical fiber assembly 200 (FIGS. 8A-8C), the optical fibers 210 of each group G are arranged with their output ends 212 in an upper curved plane configuration $C_U$ and at least a part of the rest in a lower flat plane configuration $C_L$ adjoining the curved plane configuration $C_U$. The flat plane configuration $C_L$ extends vertically. The curved plane configuration $C_U$ turns, or is bent, curvedly from the flat plane configuration $C_L$ through a bend angle of substantially 90° into a horizontal position or direction in which the output ends 212 point.

The optical fibers 210 of each group may be mounted on a thin plate former which has a curved upper part to locate the output ends 212 and a flat lower part to locate at least a part of the remainder of the optical fibers 210. The optical fibers 210 are arranged in a closely packed co-parallel manner on the curved-and-flat plate former, extending across upper and lower ends thereof.

In this example, there are twenty six (26) such curved/flat-plane groups G of optical fibers 210, and they are arranged in an equiangular arrangement about the central axis X of the optical fiber assembly 200 preferably over an angle in the range of substantially 180° to 360° about the axis X. As is shown, the groups G are arranged over an angle of 180° about, i.e. half around, the axis X. The equiangular arrangement is not exactly a radial/angular symmetrical arrangement, as the flat part of the plane of each group G does not contain the central axis X but is offset therefrom in a co-parallel manner. However, the optical fibers' output ends 212 amongst the groups G are arranged in a radial symmetrical arrangement about the central axis X, likewise over an angle of 180° thereabout.

The groups G of optical fibers 210 are arranged in an arcuate stacked arrangement, in which their curved upper parts are stacked with one group G on the next group G sequentially. The said offsetting of the flat parts of the groups G of optical fibers 210 from the central axis X gives the optical fibers' output ends 212 room to get sufficiently close to the central axis X so that they can be arranged radially symmetrically about the central axis X, without leaving much if any centre space about the central axis X.

With this arrangement, the optical fibers' output ends 212 together form a spiral staircase arrangement in the display zone 100, with the output ends 212 of each group G pointing horizontally clockwise in a progressively changing direction. The spiral staircase arrangement occupies generally the entire width and height of the display zone 100, absent any space at the centre. Each step of the spiral staircase arrangement is taken up by a linear row of the output ends 212 in the relevant group G at a respective different level of the display zone 100, for rotation to swipe across a horizontal cross-section of the display zone 100 at that level for displaying the same cross-section of the virtual 3D image in the display zone 100. In general, the output ends 212 of each group G are arranged at a different level relative to those of an adjacent group G, thereby together progressively, and sequentially, occupying the display zone 100.

In the first embodiment, unlike the second embodiment, there is a centre space Y in the spiral staircase arrangement of the optical fibers' output ends 212, where the output ends 212 cannot reach. This results in a centre hole in the display zone 100 incapable of displaying any image or part thereof. Conversely, in the second embodiment, the display zone 100 or virtual 3D image displayed therein is solid or complete at the centre.

Referring to a third embodiment of the optical fiber assembly 200 (FIGS. 9A-9C), its construction is rather similar to the second embodiment, with equivalent parts designated by the same reference numerals. The only major difference lies in the angle at which, for each group G, the curved plane configuration $C_U$ turns, or is bent, curvedly from the vertical flat plane configuration $C_L$ through a bend angle less than 90°, e.g. about 60° as shown, into an upwardly inclined position or direction in which the optical fibers' output ends 212 point. The bend angle falls within the range of substantially 0° to 90°.

The image light from the output ends 212 is emitted in an upwardly inclined direction or angle. The resulting image in the display zone 100 is readily viewable over a relatively wider range of angles both above and below the inclined angle, compared to the image displayed by the optical fiber assembly 200 in the second or third embodiment. The image light from the output ends 212 in the first embodiment is emitted in a generally vertical direction (i.e. 0° bend angle), and the image light in the second embodiment is emitted in a generally horizontal direction (i.e. 90° angle or turn). In either case, the image light emitting angle is at one end of the normal viewing range as between vertical and horizontal directions, such that the displayed image is readily viewable over a relatively narrower range of angles on only one side of the image light emitting angle.

In general, the output ends 212 of the optical fibers 210 may be arranged in different shapes in order to create different display zones 100. Thus, the vertical output ends 212 in the first embodiment create a ring-shaped display zone 100. The horizontal output ends 212 or inclined output ends 212 in the second/third embodiment create a cylindrical display zone 100.

Reference is now made to FIGS. 11A to 11C and 12A to 12D. For operation of the virtual 3D display apparatus 10, the first input end 211A of each optical fiber 210 of the optical fiber assembly 200 is linked to a corresponding source of electromagnetic radiation (i.e. colour RGB LED 400) in accordance with the mapping of video and audio effects of each pixel in the display zone 100 with those of the corresponding pixel of the "virtual model" created by the pertaining spatial modeling and graphical authoring software and/or deliverables from multimedia technologies with respect to time and geospatial coordinates (through development of proprietary programming interface and computing algorithm and deployment of interface, encoding and decoding devices).

The "virtual model", which is e.g. a sphere, is generated in 3D CAD software, without any lighting and shading information. Data pertaining to the virtual model is defined by reference to the model's internal and outer surfaces, empty space (externally of the model) and the model's colour (FIG. 11A). In the real world, the virtual 3D display apparatus is switched on to operate and rotate to, inter alia, sense/measure and collect data pertaining to the ambient light intensity and direction (FIG. 11B).

A processor 7 (FIG. 11C) of the virtual 3D display apparatus 10 then processes the aforesaid data pertaining to the virtual model and to the ambient light intensity and direction. This involves steps of, inter alia, generating pixel information based on the virtual model data, generating brightness data for each pixel based on the ambient light data, and then combining the generated pixel information and brightness data. Subsequently, the processor 7 performs steps of generating a virtual 3D image, and then operating the optical fiber assembly 200 and related components to display a ViR model (see below) in the display zone 100, which is the virtual 3D image sphere 8 depicted in FIG. 10.

The virtual 3D image generated by the virtual 3D display apparatus 10 may be referred to by reference to the proprietary term "Virtual-in-Real", and hence Virtual-in-Real or ViR image or model which is viewable virtually from any angles measured from the centre-of-origin of the display zone 100 by multiple audiences with naked eyes.

As shown in FIG. 12A, the step of combining the generated pixel information and brightness data involves combining the following data:
the model's internal pixels in solid colour predefined in a CAD model;
the model's outer surface pixels of different colours and brightness, as interacted with the ambient light data to create the appropriate shading effect; and
the empty space (transparent) pixels.

FIG. 12B illustrates the image resulting from this step of combining data, which includes the model's internal pixels, model's surface pixels and the empty pixels.

FIG. 12C illustrates the subsequent step of displaying the ViR model, i.e. the sphere 8, in the display zone 100, which involves operation of the optical fiber assembly 200 and related components. In the depicted optical fiber assembly 200, the layers 1, 2, 3 . . . N represent the optical fibers 210 at different levels. The ViR model is outputted in the display zone 100 (FIG. 12D).

The invention has been given by way of example only, and various other modifications of and/or alterations to the described embodiments may be made by persons skilled in the art without departing from the scope of the invention as specified in the appended claims.

The invention claimed is:

1. Virtual 3D display apparatus comprising:
a display zone, in which a virtual 3D image is to be displayed;
an optical fiber assembly including an input, an output positioned in the display zone, and a plurality of optical fibers each having an input end arranged at the input of the optical fiber assembly for entrance of light and an output end arranged at the output of the optical fiber assembly;
a prime mover for driving the optical fiber assembly in motion;
a plurality of light sources provided at the input of the optical fiber assembly, with each light source at the input end of a respective optical fiber for generating a respective light signal that enters and travels along the optical fiber and is then emitted at the output end thereof, with the emitted light signals together forming a virtual 3D image in the display zone upon motion of the optical fiber assembly by the prime mover; and
a plurality of control elements including at least one light sensor provided at the input of the optical fiber assembly, each for operation to make adjustment of a said virtual 3D image based on a control signal that travels along the respective optical fiber, with the adjustment to be made to a part of a said virtual 3D image associated with the same optical fiber;
wherein the light sensor is for sensing ambient light at the output end of the respective optical fiber, the ambient light acting as a said control signal and travelling from the output end along the optical fiber to the light sensor.

2. The virtual 3D display apparatus as claimed in claim 1, wherein at least one of the optical fibers has at least two, first and second input ends, with a respective light source provided at the first input end and a respective control element provided at the second input end.

3. The virtual 3D display apparatus as claimed in claim 2, wherein said at least one optical fiber incorporates a multi-mode combiner connecting said at least two input ends.

4. The virtual 3D display apparatus as claimed in claim 1, wherein the adjustment comprises adjusting brightness of the light source associated with the optical fiber based on said ambient light sensed by the light sensor.

5. The virtual 3D display apparatus as claimed in claim 1, wherein at least one of the optical fibers incorporates control means comprising a lens at the output end for controlling an optical effect at the output end of the optical fiber, and the control elements further include a signal generator for generating a control signal that travels from the input end along the optical fiber to the lens for controlling the lens to adjust the optical effect at the output end of the optical fiber, wherein the optical effect belongs to the lens and is adjustable in response to a control signal generated by the signal generator.

6. The virtual 3D display apparatus as claimed in claim 5, wherein the optical effect of the lens that is adjustable comprises opacity.

7. The virtual 3D display apparatus as claimed in claim 6, wherein the signal generator is adapted to generate a control signal that is an electromagnetic radiation of wavelengths or frequencies outside the visible electromagnetic spectrum, and preferably a UV control signal.

8. The virtual 3D display apparatus as claimed in claim 5, wherein the signal generator is provided at the input end of a respective optical fiber.

9. The virtual 3D display apparatus as claimed in claim 1, wherein the optical fibers are divided into a plurality of groups, with the output ends of the optical fibers of each group being arranged in a sequence for lateral movement across a portion of the display zone to form a respective part of a virtual 3D image.

10. The virtual 3D display apparatus as claimed in claim 9, wherein the output ends of the optical fibers of each group are arranged in a linear sequence.

11. The virtual 3D display apparatus as claimed in claim 9, wherein the optical fibers of each group are arranged in at least one of a flat and curved plane configuration.

12. The virtual 3D display apparatus as claimed in claim 11, wherein the optical fibers of each group are arranged in a flat plane configuration, and the groups of optical fibers are arranged in an equiangular arrangement about an axis of the optical fiber assembly extending across the input and output thereof.

13. The virtual 3D display apparatus as claimed in claim 12, wherein the equiangular arrangement is also a radial symmetrical arrangement.

14. The virtual 3D display apparatus as claimed in claim 13, wherein the groups of optical fibers are arranged in a radial symmetrical arrangement over an angle in the range of substantially 180° to 360° about the axis.

15. The virtual 3D display apparatus as claimed in claim 12, wherein the optical fiber assembly is arranged to be driven by the prime mover to rotate about the axis.

16. The virtual 3D display apparatus as claimed in claim 11, wherein the optical fibers of each group are arranged with their output ends in a curved plane configuration and at least a part of the rest in a flat plane configuration adjoining the curved plane configuration.

17. The virtual 3D display apparatus as claimed in claim 16, wherein the curved plane configuration of each group of optical fibers turns from the flat plane configuration through an angle in the range of substantially 0° to 90°.

18. The virtual 3D display apparatus as claimed in claim 9, wherein the groups of optical fibers are arranged in a radial symmetrical arrangement about an axis of the optical fiber assembly extending across the input and output thereof.

19. The virtual 3D display apparatus as claimed in claim 18, wherein the groups of optical fibers are arranged in a radial symmetrical arrangement over an angle of substantially 180° about the axis.

20. The virtual 3D display apparatus as claimed in claim 9, wherein the output ends of the optical fibers are arranged, as between adjacent groups, at different levels to progressively occupy the display zone.

21. The virtual 3D display apparatus as claimed in claim 9, wherein the output ends of the optical fibers of each group are arranged at a different level relative to those of an adjacent group, thereby together progressively occupying the display zone.

22. The virtual 3D display apparatus as claimed in claim 1, wherein the display zone has a substantially cylindrical shape.

23. The virtual 3D display apparatus as claimed in claim 1, wherein the light sensor is provided at the input end of a respective optical fiber.

* * * * *